United States Patent
Weber et al.

(10) Patent No.: US 10,144,807 B2
(45) Date of Patent: Dec. 4, 2018

(54) BLOCK COPOLYMERS

(71) Applicant: BASF SE, Ludwigshafen (DE)

(72) Inventors: Martin Weber, Maikammer (DE); Thomas Weiss, Ilvesheim (DE); Christian Maletzko, Altrip (DE); Bastiaan Bram Pieter Staal, Limburgerhof (DE); Klaus Muehlbach, Gruenstadt (DE); Joerg Erbes, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 134 days.

(21) Appl. No.: 14/888,563

(22) PCT Filed: Apr. 30, 2014

(86) PCT No.: PCT/EP2014/058874
§ 371 (c)(1),
(2) Date: Nov. 2, 2015

(87) PCT Pub. No.: WO2014/177638
PCT Pub. Date: Nov. 6, 2014

(65) Prior Publication Data
US 2016/0108178 A1    Apr. 21, 2016

(30) Foreign Application Priority Data
May 2, 2013  (EP) .................... 13166233

(51) Int. Cl.
| B01D 71/68 | (2006.01) |
| B01D 71/80 | (2006.01) |
| C08L 71/00 | (2006.01) |
| C08G 75/23 | (2006.01) |
| C08G 65/334 | (2006.01) |
| C08L 71/02 | (2006.01) |

(52) U.S. Cl.
CPC ............ *C08G 75/23* (2013.01); *B01D 71/68* (2013.01); *B01D 71/80* (2013.01); *C08G 65/334* (2013.01); *C08G 65/3344* (2013.01); *C08G 65/3346* (2013.01); *C08L 71/00* (2013.01); *C08L 71/02* (2013.01)

(58) Field of Classification Search
None
See application file for complete search history.

(56) References Cited

U.S. PATENT DOCUMENTS

| 4,870,153 A | 9/1989 | Matzner et al. |
| 5,700,902 A | 12/1997 | Hancock et al. |
| 5,700,903 A | 12/1997 | Hancock et al. |
| 5,798,437 A | 8/1998 | Hancock et al. |
| 5,834,583 A | 11/1998 | Hancock et al. |
| 5,911,880 A | 6/1999 | Klein et al. |
| 8,716,381 B2 | 5/2014 | Mettlach et al. |
| 8,729,164 B2 | 5/2014 | Hennenberger et al. |
| 8,883,904 B2 | 11/2014 | Roth et al. |
| 8,952,109 B2 | 2/2015 | Weber et al. |
| 9,120,062 B2 | 9/2015 | Weber et al. |
| 9,127,160 B2 | 9/2015 | Weber et al. |
| 9,199,205 B2 | 12/2015 | Weber et al. |

FOREIGN PATENT DOCUMENTS

| EP | 0 113 112 A1 | 7/1984 |
| EP | 0 135 130 A2 | 3/1985 |
| EP | 0 297 363 A2 | 1/1989 |
| EP | 0 739 925 A2 | 10/1996 |
| EP | 0 781 795 A2 | 7/1997 |
| EP | 1 743 690 A1 | 1/2007 |
| EP | 0 937 492 B1 | 8/2007 |
| EP | 2 008 704 A1 | 12/2008 |
| EP | 2 158 958 A1 | 3/2010 |
| WO | WO 97/05190 A1 | 2/1997 |
| WO | WO 97/22406 A1 | 6/1997 |
| WO | WO 2010/057822 A1 | 5/2010 |
| WO | WO 2010/121628 A1 | 10/2010 |

OTHER PUBLICATIONS

U.S. Appl. No. 13/473,022, filed May 16, 2012, US 2012/0296028 A1, Martin Weber, et al.
U.S. Appl. No. 14/580,887, filed Dec. 23, 2014, US 2015/0112013 A1, Martin Weber, et al.
U.S. Appl. No. 13/630,658, filed Sep. 28, 2012, US 2013/0085224 A1, Martin Weber, et al.
U.S. Appl. No. 13/851,651, filed Mar. 27, 2013, US 2013/0255785 A1, Jochen Schmid, et al.
U.S. Appl. No. 14/141,134, filed Dec. 26, 2013, US 2014/0183031 A1, Christoph Sigwart, et al.
U.S. Appl. No. 14/141,115, filed Dec. 26, 2013, US 2014/0187737 A1, Jorg Erbes, et al.
U.S. Appl. No. 14/140,642, filed Dec. 26, 2013, US 2014/0187796 A1, Christoph Sigwart, et al.
U.S. Appl. No. 14/140,679, filed Dec. 26, 2013, US 2014/0183028 A1, Christoph Sigwart, et al.
U.S. Appl. No. 14/140,908, filed Dec. 26, 2013, US 2014/0183029 A1, Jorg Erbes, et al.
U.S. Appl. No. 14/140,947, filed Dec. 26, 2013, US 2014/0183032 A1, Christoph Sigwart, et al.
U.S. Appl. No. 14/140,861, filed Dec. 26, 2013, US 2014/0183030 A1, Christoph Sigwart, et al.
U.S. Appl. No. 13/918,164, filed Jun. 14, 2013, US 2013/0341273 A1, Martin Weber, et al.
U.S. Appl. No. 14/888,570, filed Nov. 2, 2015, Martin Weber, et al.
U.S. Appl. No. 14/770,684, filed Aug. 26, 2015, US 2016/0002411 A1, Edoardo Menozzi, et al.
U.S. Appl. No. 14/888,316, filed Oct. 30, 2015, Martin Weber, et al.

(Continued)

*Primary Examiner* — Krishnan S Menon
(74) *Attorney, Agent, or Firm* — Oblon, McClelland, Maier & Neustadt, L.L.P.

(57) ABSTRACT

Block copolymer comprising polyarylene ether blocks and polyalkylene oxide blocks, wherein said block copolymer comprises at least two polyalkylene oxide blocks that are endcapped with different endcapping groups.

16 Claims, No Drawings

(56) References Cited

OTHER PUBLICATIONS

International Search Report dated Oct. 24, 2014 in PCT/EP2014/058874.
Yuan-Ping R. Ting, et al., "Preparation of Polysulfone/Poly(ethylene oxide) Block Copolymers" Macromolecules—American Chemical Society, vol. 29, No. 23, XP002195648, Nov. 4, 1996, pp. 7619-7621.
E. M. Koch, et al., "Polysulfon (PSU)" Kunststoffe, 1990, pp. 1146-1154.
Selvaraj Savariar, et al., "Polysulfone with lower levels of cyclic dimer: Use of MALDI-TOF in the study of cyclic oligomers" Desalination, vol. 144, 2002, pp. 15-20.
R. N. Johnson, et al., "Poly(aryl Ethers) by Nucleophilic Aromatic Substitution. I. Synthesis and Properties" Journal of Polymer Science, vol. 5, 1967, pp. 2375-2398.
R. Viswanathan, et al., "Synthesis, kinetic observations and characteristics of polyarylene ether sulphones prepared via a potassium carbonate DMAC process" Polymer, vol. 25, 1984, pp. 1827-1836.

BLOCK COPOLYMERS

The present invention relates to novel block copolymers comprising polyarylene ether blocks and polyalkylene oxide blocks, wherein said block copolymer comprises at least two different polyalkylene oxide blocks that are endcapped with different alkyl groups.

The present invention further relates processes for the manufacture of such block copolymers and their use as membrane material.

Polyether sulfones and polysulfones belong to the group of high-performance thermoplastics (E. M. Koch, H.-M. Walter, Kunststoffe 80 (1990) 1146; E. Döring, Kunststoffe 80 (1990), 1149). Owing to their good biocompatibility, polyether sulfones and polysulfones are also used as material for the production of dialysis membranes (S. Savariar, G. S. Underwood, E. M. Dickinson, P. J. Schielke, A. S. Hay, Desalination 144 (2002) 15).

The preparation of the polyether sulfones and polysulfones is usually effected by polycondensation of suitable monomer building blocks in dipolar aprotic solvents at elevated temperature (R. N. Johnson et al., J. Polym. Sci. A-1 5 (1967) 2375, J. E. McGrath et al., Polymer 25 (1984) 1827).

The preparation of polyarylene ether sulfones from suitable aromatic bishalosulfones and aromatic bisphenols or salts thereof in the presence of at least one alkali metal or ammonium carbonate or bicarbonate in an aprotic solvent is described, for example, in U.S. Pat. No. 4,870,153, EP 113 112, EP-A 297 363 and EP-A 135 130.

One disadvantage of pure polyarylene ethers is their low hydrophilicity. To enhance the hydrophilicity of polyarylene ethers, polyethersulfone (PESU)-polyethyleneoxide (PEO) block copolymers have been prepared.

The synthesis of polyarylene ether-polyalkylene oxide copolymers described in Macromolecules 29 (23) p. 7619 (1996) requires long reaction times.

EP 739 925, U.S. Pat. No. 5,700,902 and U.S. Pat. No. 5,700,903 also describe polyarylene ether and polyalkylene oxide copolymers.

U.S. Pat. No. 5,700,902 discloses block copolymers with hydrophobic blocks and hydrophilic blocks, wherein hydrophilic blocks can be PEO blocks that are endcapped on one side with an alkyl group.

U.S. Pat. No. 5,798,437, U.S. Pat. No. 5,834,583, WO 97/22406 disclose processes for the manufacture of hydrophilic copolymers.

U.S. Pat. No. 5,911,880 discloses membranes made of polyether sulfone comprising an amphiphilic additive.

It was an object of the present invention to provide block copolymers that have a high glass transition temperature and that do not show the problems of copolymers known from the art.

This problem has been solved by block copolymers comprising polyarylene ether blocks and polyalkylene oxide blocks, wherein said block copolymer comprises at least two different polyalkylene oxide blocks that are endcapped with different endcapping groups. In other words, block copolymers according to the invention comprise polyarylene ether blocks and at least two sets of polyalkylene oxide blocks.

The term "block copolymer" shall, unless stated otherwise, not mean an individual polymer molecule but the entirety of all polymeric components in a polymer. In particular, the at least two sets of polyalkylene oxide blocks that are present in block copolymers according to the invention, are part of different individual polymer molecules.

Suitable polyarylene ether blocks of copolymers according to the invention are known as such to those skilled in the art and can be formed from polyarylene ether units of the general formula II

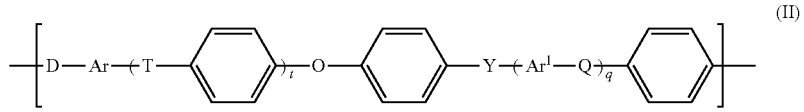

with the following definitions:

t, q: each independently 0, 1, 2 or 3,

Q, T, Y: each independently a chemical bond or group selected from —O—, —S—, —SO$_2$—, S=O, C=O, —N=N—, —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—, and Ar, Ar$^1$: each independently an arylene group having from 6 to 18 carbon atoms, D: a chemical bond or —O—.

In particular, D is an oxygen atom —O— when bound to another arylenether unit. D is a chemical bond when bound to a polyalkyleneoxide block.

The polyarylene ethers are typically prepared by polycondensation of suitable starting compounds in dipolar aprotic solvents at elevated temperature (see, for example, R. N. Johnson et al., J. Polym. Sci. A-1 5 (1967) 2375, J. E. McGrath et al., Polymer 25 (1984) 1827). Possible syntheses of the OH-terminated polyarylene ethers are also described in WO 2010/057822 on p. 2 ln. 27 to p. 14, ln. 35 as well as p. 16, ln 8 to 18, ln 29.

Suitable polyarylene ether blocks can be provided by reacting at least one starting compound of the structure X—Ar—Y (M1) with at least one starting compound of the structure HO—Ar$^1$—OH (M2) in the presence of a solvent (L) and of a base (B), where Y is a halogen atom, X is selected from halogen atoms and OH, preferably from halogen atoms, especially F, Cl or Br, and Ar and Ar$^1$ are each independently an arylene group having 6 to 18 carbon atoms.

In one embodiment, a polyarylene ether which is formed from units of the general formula II with the definitions as above is provided in the presence of a solvent (L):

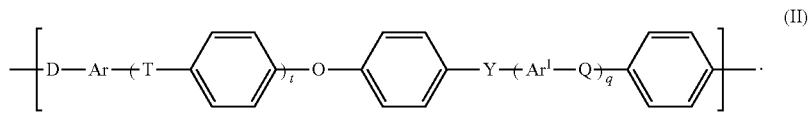

If Q, T or Y, with the abovementioned prerequisites, is a chemical bond, this is understood to mean that the group adjacent to the left and the group adjacent to the right are bonded directly to one another via a chemical bond.

Preferably, Q, T and Y in formula (I), however, are independently selected from —O— and —SO$_2$—, with the proviso that at least one of the group consisting of Q, T and Y is —SO$_2$—.

When Q, T or Y are —CR$^a$R$^b$—, R$^a$ and R$^b$ are each independently a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particularly preferred C$_1$-C$_{12}$-alkyl groups are: C$_1$-C$_6$-alkyl radicals such as methyl, ethyl, n-propyl, isopropyl, n-butyl, sec-butyl, 2- or 3-methylpentyl and longer-chain radicals such as unbranched heptyl, octyl, nonyl, decyl, undecyl, lauryl, and the singularly or multiply branched analogs thereof.

Useful alkyl radicals in the aforementioned usable C$_1$-C$_{12}$-alkoxy groups include the alkyl groups having from 1 to 12 carbon atoms defined above. Cycloalkyl radicals usable with preference comprise especially C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclpentylethyl, -propyl, -butyl, -pentyl, -hexyl, cyclohexylmethyl, -dimethyl, -trimethyl.

Ar and Ar$^1$ are each independently a C$_6$-C$_{18}$-arylene group. Proceeding from the starting materials described below, Ar is preferably derived from an electron-rich aromatic substance which is preferably selected from the group consisting of hydroquinone, resorcinol, dihydroxynaphthalene, especially 2,7-dihydroxynaphthalene, and 4,4'-bisphenol. Ar$^1$ is preferably an unsubstituted C$_6$- or C$_{12}$-arylene group.

Useful C$_6$-C$_{18}$-arylene groups Ar and Ar$^1$ are especially phenylene groups, such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and Ar$^1$ in the preferred embodiments of the formula (II) are each independently selected from the group consisting of 1,4-phenylene, 1,3-phenylene, naphthylene, especially 2,7-dihydroxynaphthalene, and 4,4'-bisphenylene.

Units present with preference within the polyarylene ether are those which comprise at least one of the following repeat structural units IIa to IIo, wherein D has the same meaning as defined above:

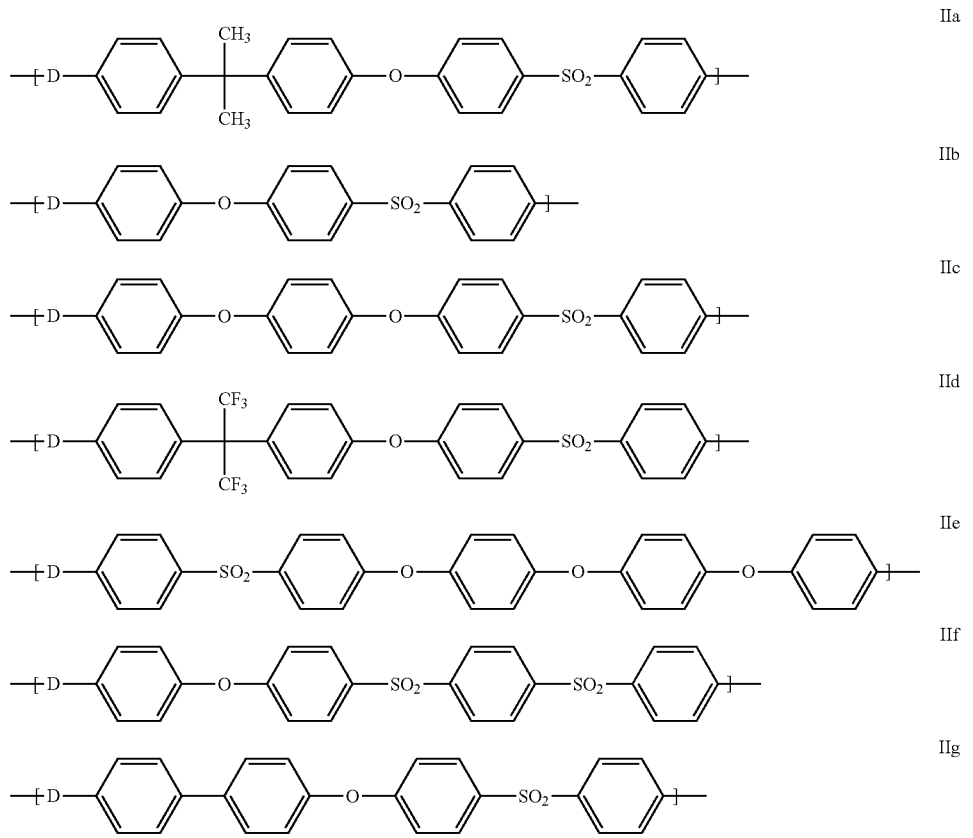

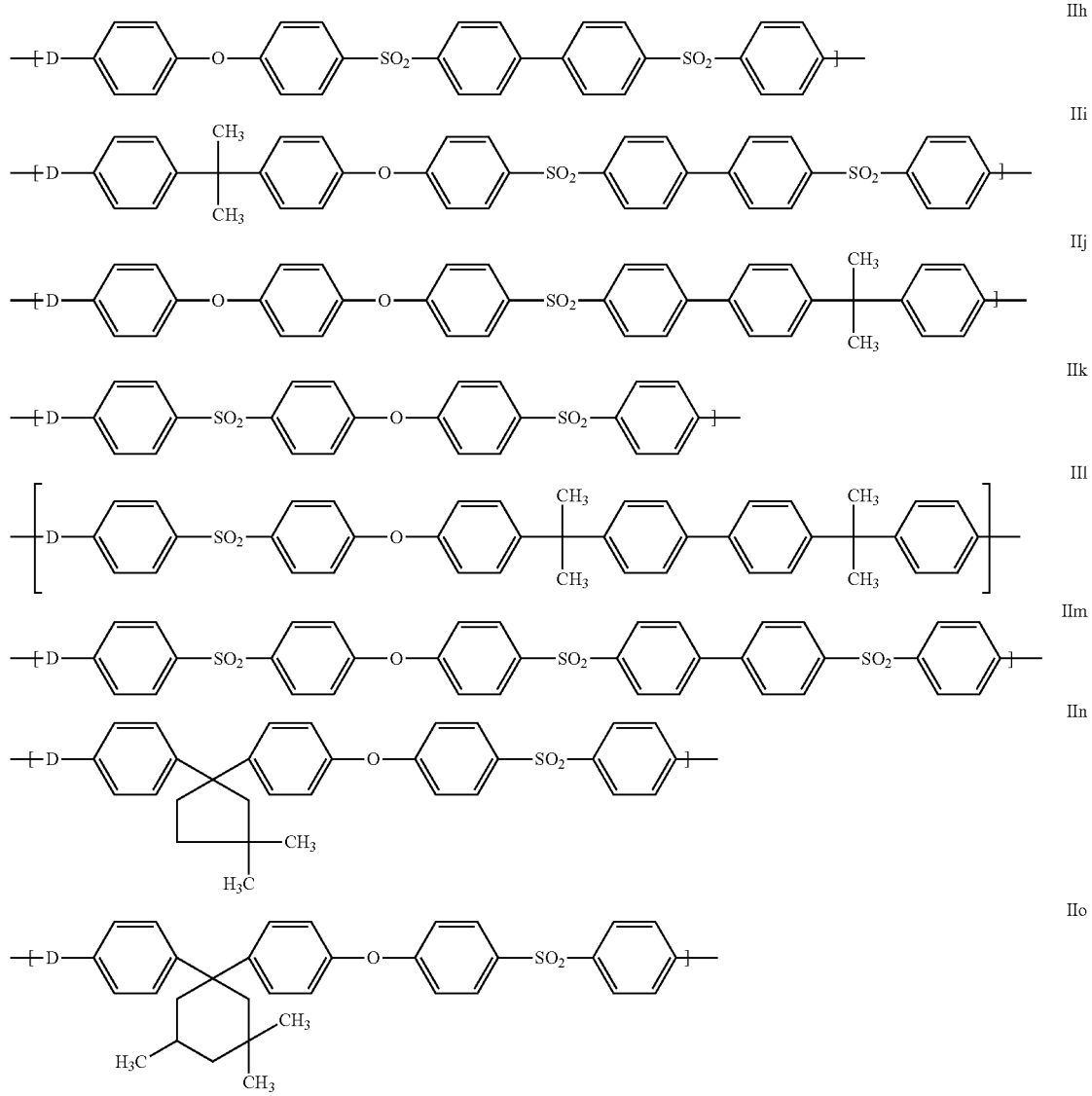

In addition to the units IIa to IIo present with preference, preference is also given to those units in which one or more 1,4-dihydroxyphenyl units are replaced by resorcinol or dihydroxynaphthalene units.

Particularly preferred units of the general formula II are units IIa, IIg and IIk. It is also particularly preferred when the polyarylene ether blocks are formed essentially from one kind of units of the general formula II, especially from one unit selected from IIa, IIg and IIk.

In a particularly preferred embodiment, Ar=1,4-phenylene, t=1, q=0, T=$SO_2$ and Y=$SO_2$. Such polyarylene ethers are referred to as polyether sulfone (PESU).

Suitable polyarylene ether blocks preferably have a mean molecular weight Mn (number average) in the range from 2000 to 70000 g/mol, especially preferably 5000 to 40000 g/mol and particularly preferably 7000 to 30000 g/mol. The average molecular weight of the polyarylene ether blocks can be controlled and calculated by the ratio of the monomers forming the polyarylene ether blocks, as described by H. G. Elias in "An Introduction to Polymer Science" VCH Weinheim, 1997, p. 125.

Suitable starting compounds are known to those skilled in the art and are not subject to any fundamental restriction, provided that the substituents mentioned are sufficiently reactive within a nucleophilic aromatic substitution.

Preferred starting compounds are difunctional. "Difunctional" means that the number of groups reactive in the nucleophilic aromatic substitution is two per starting compound. A further criterion for a suitable difunctional starting compound is a sufficient solubility in the solvent, as explained in detail below.

Preference is given to monomeric starting compounds, which means that the reaction is preferably performed proceeding from monomers and not proceeding from prepolymers.

The starting compound (M1) used is preferably a dihalodiphenyl sulfone. The starting compound (M2) used is preferably dihydroxydiphenyl sulfone.

Suitable starting compounds (M1) are especially dihalodiphenyl sulfones such as 4,4'-dichlorodiphenyl sulfone, 4,4'-difluorodiphenyl sulfone, 4,4'-dibromodiphenyl sulfone, bis(2-chlorophenyl) sulfones, 2,2'-dichlorodiphenyl sulfone and 2,2'-difluorodiphenyl sulfone, particular preference being given to 4,4'-dichlorodiphenyl sulfone and 4,4'-difluorodiphenyl sulfone.

Preferred compounds (M2) are accordingly those having two phenolic hydroxyl groups.

Phenolic OH groups are preferably reacted in the presence of a base in order to increase the reactivity toward the halogen substituents of the starting compound (M1).

Preferred starting compounds (M2) having two phenolic hydroxyl groups are selected from the following compounds:

dihydroxybenzenes, especially hydroquinone and resorcinol;
dihydroxynaphthalenes, especially 1,5-dihydroxynaphthalene, 1,6-dihydroxynaphthalene, 1,7-dihydroxynaphthalene, and 2,7-dihydroxynaphthalene;
dihydroxybiphenyls, especially 4,4'-biphenol and 2,2'-biphenol;
bisphenyl ethers, especially bis(4-hydroxyphenyl) ether and bis(2-hydroxyphenyl) ether;
bisphenylpropanes, especially 2,2-bis(4-hydroxyphenyl)propane, 2,2-bis(3-methyl-4-hydroxyphenyl)propane and 2,2-bis(3,5-dimethyl-4-hydroxyphenyl)propane;
bisphenylmethanes, especially bis(4-hydroxyphenyl)methane;
bisphenyl sulfones, especially bis(4-hydroxyphenyl) sulfone;
bisphenyl sulfides, especially bis(4-hydroxyphenyl) sulfide;
bisphenyl ketones, especially bis(4-hydroxyphenyl) ketone;
bisphenylhexafluoropropanes, especially 2,2-bis(3,5-dimethyl-4-hydroxyphenyl)hexafluoropropane; and
bisphenylfluorenes, especially 9,9-bis(4-hydroxyphenyl)fluorene;
1,1-Bis(4-hydroxyphenyl)-3,3,5-trimethyl-cyclohexane (bisphenol TMC).

It is preferable, proceeding from the aforementioned aromatic dihydroxy compounds (M2), by addition of a base (B), to prepare the dipotassium or disodium salts thereof and to react them with the starting compound (M1). The aforementioned compounds can additionally be used individually or as a combination of two or more of the aforementioned compounds.

Hydroquinone, resorcinol, dihydroxynaphthalene, especially 2,7-dihydroxynaphthalene, bisphenol A, dihydroxydiphenyl sulfone and 4,4'-bisphenol are particularly preferred as starting compound (M2).

However, it is also possible to use trifunctional compounds. In this case, branched structures are the result. If a trifunctional starting compound (M2) is used, preference is given to 1,1,1-tris(4-hydroxyphenyl)ethane.

The ratios to be used derive in principle from the stoichiometry of the polycondensation reaction which proceeds with theoretical elimination of hydrogen chloride, and are established by the person skilled in the art in a known manner.

In a preferred embodiment, the ratio of halogen end groups to phenolic end groups is adjusted by controlled establishment of an excess of the dihalogen starting compound (M1) in relation to a difunctional compound (M2) as starting compound and polyalkyleneoxide.

More preferably, the molar (M1)/(M2) ratio in this embodiment is from 1.003 to 1.25, especially from 1.05 to 1.15, most preferably from 1.01 to 1.1.

Preferably, the molar (M1)/(M2+polyalkyleneoxide) ratio is 1.005 to 1.2.

Alternatively, it is also possible to use a starting compound (M1) where X=halogen and Y=OH. In this case, the ratio of halogen to OH end groups used is preferably from 1.01 to 1.2, especially from 1.03 to 1.15, most preferably 1.05 to 1.1.

Preferably, the conversion in the polycondensation is at least 0.9, which ensures a sufficiently high molecular weight.

Solvents (L) preferred in the context of the present invention are organic, especially aprotic polar solvents. Suitable solvents also have a boiling point in the range from 80 to 320° C., especially 100 to 280° C., preferably from 150 to 250° C. Suitable aprotic polar solvents are, for example, high-boiling ethers, esters, ketones, asymmetrically halogenated hydrocarbons, anisole, dimethylformamide, dimethyl sulfoxide, sulfolane, N-methyl-2-pyrrolidone and/or N-ethyl-2-pyrrolidone. It is also possible to use mixtures of these solvents.

A preferred solvent is especially N-methyl-2-pyrrolidone and/or N-ethyl-2-pyrrolidone.

Preferably, the starting compounds (M1) and (M2) and polyalkyleneoxide are reacted in the aprotic polar solvents (L) mentioned, especially N-methyl-2-pyrrolidone.

The starting compounds (M1) and (M2) and polyalkyleneoxide are reacted in the presence of a base (B). The bases are preferably anhydrous. Suitable bases are especially anhydrous alkali metal and/or alkaline earth metal carbonate, preferably sodium carbonate, potassium carbonate, calcium carbonate or mixtures thereof, very particular preference being given to potassium carbonate, especially potassium carbonate with a volume-weighted mean particle size of less than 200 micrometers, determined with a particle size measuring instrument in a suspension of N-methyl-2-pyrrolidone.

A particularly preferred combination is N-methyl-2-pyrrolidone as solvent (L) and potassium carbonate as base (B).

The reaction of the suitable starting compounds (M1) and (M2) and polyalkyleneoxide is performed at a temperature of 80 to 250° C., preferably 100 to 220° C., the upper temperature limit being determined by the boiling point of the solvent.

The reaction is effected preferably within a time interval of 2 to 12 h, especially of 3 to 8 h.

Especially suitable starting materials, bases, solvents, ratios of all components involved, reaction times and reaction parameters like temperatures and pressures as well as suitable workup procedures are for example disclosed in U.S. Pat. No. 4,870,153, col. 4, ln. 11 to col. 17, ln. 64, EP 113 112, p. 6, ln. 1 to p. 9, ln. 14, EP-A 297 363, p. 10, ln. 38 to p. 11, ln. 24, EP-A 135 130, p. 1, ln. 37 to p. 4, ln. 20, which are incorporated in this application by reference.

Suitable polyalkylene oxides are particularly polyethers of diols. Suitable polyalkylene oxides are normally produced by polymerization of at least one alkylene oxide. Suitable monomeric alkylene oxides are for example ethylene oxide or substituted ethylene oxides bearing one or more alkyl and/or aryl groups. Suitable monomeric alkylene oxides are for example styrene oxide or $C_2$-$C_{20}$-alkylene oxides, such as ethylene oxide, propylene oxide, 1,2-butylene oxide, 2,3-butylene oxide, isobutylene oxide, pentene oxide, hexene oxide, cyclohexene oxide, dodecene epoxide, octadecene epoxide. Ethylene oxide, propylene oxide, 1,2-butylene oxide, 2,3-butylene oxide, isobutylene oxide and pentene oxide are particularly suitable, propylene oxide and ethylene oxide being particularly preferred.

Suitable polyalkylene oxides can be homopolymers or copolymers.

In one embodiment, suitable polyalkylene oxides are copolymers of at least two different alkylene oxides. In one embodiment, suitable polyalkylene oxides are statistical copolymers of at least two different alkylene oxides. In another embodiment, suitable polyalkylene oxides are block copolymers of at least two different alkylene oxides.

In one preferred embodiment, suitable polyalkylene oxides are homopolymers of ethyleneoxide ("polyethylene oxide") or propylene oxide ("polypropylene oxide").

In one embodiment, suitable polyalkylene oxides are statistical copolymers of ethylene oxide and propylene oxide.

In one embodiment, suitable polyalkylene oxides are block copolymers of ethylene oxide and propylene oxide.

Suitable polyalkylene oxides can be linear or branched. Branching of a polyalkylene oxide can for example be achieved by including monomers bearing an epoxide group and an OH or a chloro moiety into the polyalkylene oxide. Preferably, suitable polyalkylene oxides are linear.

Suitable polyalkylene oxide blocks normally comprise 1 to 500 alkyleneoxide units. Preferably, suitable polyalkylene oxides comprise 2 to 300, more preferably 3 to 150, even more preferably 5 to 100 and especially preferably 10 to 80 alkylene oxide units.

Suitable polyalkylene oxide blocks are endcapped with an endcapping group. The term "endcapped" means that the polyalkylene oxide block bears at one terminal position an endcapping group that is bound via an ether group and that does not comprise further OH groups.

This means that the polyalkyleneoxide blocks are formally etherified with a monoalcohol. Suitable endcapping groups can be aliphatic or aromatic, and can for example be alkyl groups, substituted alkyl groups, phenyl groups or substituted phenyl groups.

Preferably, suitable polyalkylene oxide blocks are endcapped with an $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$ or $C_{22}$-alkyl group.

More preferably, Suitable polyalkylene oxide blocks are endcapped with a group selected from methyl, ethyl, propyl, butyl, hexyl, Cis-alkyl, Cis-alkyl.

Suitable endcapping groups can be linear or branched. Preferably, suitable polyalkylene oxide blocks are endcapped with a linear alkyl group.

Block copolymers according to the invention comprise polyalkylene oxide blocks and polyarylene ether blocks. Normally, at least 70 mol %, preferably at least 80 mol % and more preferably at least 90 mol % and even more preferably at least 99 mol % of said polyalkylene oxide blocks are covalently bound to a polyarylene ether block. In one preferred embodiment essentially all polyalkylene oxide blocks are covalently bound to a polyarylene ether block. Normally, said polyalkylene oxide blocks are covalently bound to a polyarylene ether block via an —O— group (an ether group).

In one preferred embodiment, block copolymers according to the invention comprise individual polymer molecules of the general structure AB or ABA, with A being a polyalkylene oxide block and B being an polyarylene ether block. Normally, at least 50 mol %, preferably at least 70 mol %, more preferably at least 90 and even more preferably at least 95 mol % of all individual polymer molecules comprising a polyalkylene oxide block that are comprised in block copolymers according to the invention have the general structure AB or ABA.

In one embodiment, at least 50 mol %, more preferably at least 70 mol %, even more preferably at least 80 mol %, especially preferably at least 90 mol % and particularly preferably at least 95 mol % or at least 99 mol % of the individual polymer molecules comprised in block copolymers according to the invention comprise at least one polyalkylene oxide block and at least one polyarylene ether block.

Block copolymers according to the invention comprise at least two polyalkylene oxide blocks that are endcapped with different endcapping groups, preferably at least two different alkyl groups.

Preferably, block copolymers according to the invention comprise at least two polyalkylene oxide blocks that are endcapped with different endcapping groups, preferably alkyl groups that are otherwise identical.

Block copolymers according to the invention comprise at least two sets of polyalkylene oxide blocks that are endcapped with different endcapping groups, preferably at least two different alkyl groups.

Preferably, block copolymers according to the invention comprise at least two sets of polyalkylene oxide blocks that are endcapped with different endcapping groups, preferably alkyl groups that are otherwise identical.

In one embodiment of the invention, the mass of the at least two different endcapping alkyl groups differ by one methylene group. For example, block copolymers according to the invention may comprise polyalkylene blocks endcapped with a methyl group and polyalkylene oxide blocks that are endcapped with an ethyl group.

In one embodiment of the invention, the mass of the at least two different endcapping alkyl groups differ by two methylene groups. For example, block copolymers according to the invention may comprise polyalkylene blocks endcapped with a $C_{16}$-alkyl group and polyalkylene oxide blocks that are endcapped with a $C_{16}$-alkyl group.

In one embodiment of the invention, the mass of the at least two different endcapping alkyl groups differ by more than two methylene groups. For example, block copolymers according to the invention may comprise polyalkylene blocks endcapped with a butyl group and polyalkylene oxide blocks that are endcapped with a methyl group.

In one preferred embodiment, polyarylene oxide blocks in block copolymers according the embodiments that are given below, are polysulfones, polyethersulfones or polyphenylenesulfones.

In one embodiment of the invention, block copolymers according to the invention comprise polyalkylene oxide blocks endcapped with a methyl group and polyalkylene oxide blocks that are endcapped with an ethyl group.

In one embodiment of the invention, block copolymers according to the invention comprise polyalkylene oxide blocks endcapped with a methyl group and polyalkylene oxide blocks that are endcapped with a propyl group.

In one embodiment of the invention, block copolymers according to the invention comprise polyalkylene oxide blocks endcapped with an ethyl group and polyalkylene oxide blocks that are endcapped with a propyl group.

In one embodiment of the invention, block copolymers according to the invention comprise polyalkylene oxide blocks endcapped with an ethyl group and polyalkylene oxide blocks that are endcapped with a butyl group.

In one embodiment of the invention, block copolymers according to the invention comprise polyalkylene oxide blocks endcapped with a $C_{16}$-alkyl group and polyalkylene oxide blocks that are endcapped with a $C_{16}$-alkyl group.

In one embodiment of the invention, block copolymers according to the invention comprise polyalkylene oxide blocks endcapped with a linear $C_{16}$-alkyl group and polyalkylene oxide blocks that are endcapped with a linear $C_{16}$-alkyl group.

In one embodiment of the invention, block copolymers according to the invention comprise polyethylene oxide blocks endcapped with a methyl group and polyethylene oxide blocks that are endcapped with an ethyl group.

In one embodiment of the invention, block copolymers according to the invention comprise polyethylene oxide blocks endcapped with a methyl group and polyethylene oxide blocks that are endcapped with a propyl group.

In one embodiment of the invention, block copolymers according to the invention comprise polyethylene oxide blocks endcapped with an ethyl group and polyethylene oxide blocks that are endcapped with a propyl group.

In one embodiment of the invention, block copolymers according to the invention comprise polyethylene oxide blocks endcapped with an ethyl group and polyethylene oxide blocks that are endcapped with a butyl group.

In one embodiment of the invention, block copolymers according to the invention comprise polyethylene oxide blocks endcapped with a $C_{16}$-alkyl group and polyethylene oxide blocks that are endcapped with a $C_{16}$-alkyl group.

In one embodiment of the invention, block copolymers according to the invention comprise polyethylene oxide blocks endcapped with a linear $C_{16}$-alkyl group and polyethylene oxide blocks that are endcapped with a linear $C_{16}$-alkyl group.

In one embodiment of the invention block copolymers according to the invention comprise polyarylene ether blocks and polyalkylene oxide blocks, wherein said block copolymer comprises at least two different polyalkylene oxide blocks of the general formula

$$R^{xA}-(OCH_2-CHR^B)_k-O- \quad (I),$$

wherein x is an index number, $R^{xA}$ denotes an aliphatic or aromatic rest, $R^B$ denotes hydrogen or an aliphatic or aromatic rest, k is a number from 1 to 500, wherein said at least two different polyalkylene oxide blocks differ with respect to $R^{xA}$, and wherein said polyalkylene oxide block is covalently bound to the rest of said block copolymer.

x is an index number to differentiate polyalkylene blocks by the endcapping group $R^A$. Polyalkylene blocks with the same endcapping group bear the same index number x.

In a preferred embodiment $R^B$ in formula (I) is H, methyl, ethyl, phenyl, especially preferably $R^B$ is H.

k is a number from 1 to 500, preferably 2 to 300, more preferably 3 to 150, even more preferably 5 to 100 and especially preferably 10 to 80.

Block copolymers according to the invention comprise polyalkylene oxide blocks with at least two different rests $R^{1a}$ and $R^{2a}$.

In one embodiment, $R^{1A}$ in formula (I) is $C_{16}$ alkyl and $R^{2A}$ is $C_{18}$ alkyl.

In another embodiment, $R^{1A}$ in formula (I) is $C_{16}$ alkyl and $R^{2A}$ is $C_{14}$ alkyl.

In another embodiment, $R^{1A}$ in formula (I) is $C_{18}$ alkyl and $R^{2A}$ is $C_{20}$ alkyl.

In another embodiment, $R^{1A}$ in formula (I) is methyl and $R^{2A}$ is ethyl.

In another embodiment, $R^{1A}$ in formula (I) is methyl and $R^{2A}$ is propyl.

In another embodiment, $R^{1A}$ in formula (I) is methyl and $R^{2A}$ is butyl.

In another embodiment, $R^{1A}$ in formula (I) is 2-ethylhexyl and $R^{2A}$ is hexyl.

In another embodiment, $R^{1A}$ in formula (I) is ethyl and $R^{2A}$ is propyl.

In another embodiment, $R^{1A}$ in formula (I) is ethyl and $R^{2A}$ is butyl.

In one embodiment, $R^{1A}$ in formula (I) is $C_{16}$ alkyl and $R^{2A}$ is $C_{18}$ alkyl and $R^B$ is H.

In another embodiment, $R^{1A}$ in formula (I) is $C_{16}$ alkyl and $R^{2A}$ is $C_{14}$ alkyl and $R^B$ is H.

In another embodiment, $R^{1A}$ in formula (I) is $C_{18}$ alkyl and $R^{2A}$ is $C_{20}$ alkyl and $R^B$ is H.

In another embodiment, $R^{1A}$ in formula (I) is methyl and $R^{2A}$ is ethyl and $R^B$ is H.

In another embodiment, $R^{1A}$ in formula (I) is methyl and $R^{2A}$ is propyl and $R^B$ is H.

In another embodiment, $R^{1A}$ in formula (I) is methyl and $R^{2A}$ is butyl and $R^B$ is H.

In another embodiment, $R^{1A}$ in formula (I) is 2-ethylhexyl and $R^{2A}$ is hexyl and $R^B$ is H.

In another embodiment, $R^{1A}$ in formula (I) is ethyl and $R^{2A}$ is propyl and $R^B$ is H.

In another embodiment, $R^{1A}$ in formula (I) is ethyl and $R^{2A}$ is butyl and $R^B$ is H.

In one embodiment, block copolymers according to the invention comprise at least two different sets of individual polymer molecules according to formula III:

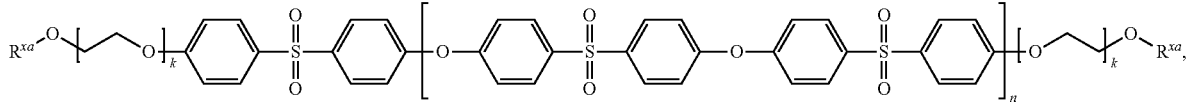

(III)

wherein k and $R^{xa}$ have the same meaning as defined above and n is a number from 4 to 150, preferably 10 to 100, more preferably 15 to 50.

In the context of this application, a set of polyalkylene-oxide blocks shall be understood to comprise all polyalkyleneoxide blocks present in a block copolymer that are endcapped with the same endcapping group. A set of polymer molecules shall be understood to comprise all polymer molecules comprising polyalkylene oxide blocks that are endcapped with the same endcapping group.

In a preferred embodiment, at least two sets of polyalkylene oxides differ with respect to the endcapping group, but are otherwise essentially identical with respect to the composition of the polyalkylene oxide. "Essentially identical with respect to the composition" in this context means that the at least two sets of polyalkylene oxides comprise essentially identical amounts of monomeric alkylene oxides and have an essentially identical molecular mass distribution. This means that the content (the weight) of each of the monomeric alkylene oxides comprised in the polyalkylene oxide is comprised therein in an amount that is identical or differs by maximally five % by weight relative to the set with the higher respective content. "Essentially identical molecular mass distribution" means that the number average molecular weight (determined by titration of the OH end groups) of the at least two sets of polyalkylene oxides differs by not more than 10%, preferably 5% relative to the heavier set of polyalkylene oxides.

In one preferred embodiment of the invention, block copolymers according to the invention comprise at least two sets of polyalkylene oxide blocks that are each present in an amount of at least 5 mol %, preferably 10 mol %, more preferably 20 mol % and especially preferably 30 mol %, relative to the molar amount of all polyalkylene oxide blocks present in the block copolymer.

In one preferred embodiment of the invention, block copolymers according to the invention comprise exactly two sets of polyalkylene oxide blocks.

In one preferred embodiment of the invention, block copolymers according to the invention comprise two sets of polyalkylene oxide blocks that are each present in an amount of at least 5 mol %, preferably 10 mol %, more preferably 20 mol % and especially preferably 30 mol %, relative to the molar amount of all polyalkylene oxide blocks present in the block copolymer.

In one preferred embodiment of the invention, block copolymers according to the invention comprise at least two polyalkylene oxide blocks that are endcapped with different alkyl groups, wherein at least two different alkyl groups are present in a molar ratio from 1:1 to 1:20, preferably from 1:1.05 to 1:10, more preferably from 1:1 to 1:5.

In one embodiment of the invention, block copolymers according to the invention comprise polyalkylene oxide blocks endcapped with a linear $C_{16}$-alkyl group and polyalkylene oxide blocks that are endcapped with a linear $C_{16}$-alkyl group, and wherein said $C_{16}$- and $C_{18}$-alkyl groups are present in the block copolymer in a molar ratio of 90:100 to 10:90, preferably 40:60 to 60:40, even more preferably 45:55 to 55:45 or 50:50.

In one embodiment of the invention, block copolymers according to the invention comprise polyethylene oxide blocks endcapped with a linear $C_{16}$-alkyl group and polyethylene oxide blocks that are endcapped with a linear $C_{16}$-alkyl group, and wherein said $C_{16}$- and $C_{18}$-alkyl groups are present in a molar ration of 90:10 to 10:90, preferably 40:60 to 60:40, even more preferably 45:55 to 55:45 or 50:50.

Usually, the average molecular weight Mw (determined by GPC according to the procedure given in the experimental section) of block copolymers according to the invention is 5000 to 150.000 g/mol, preferably 7500 to 50.000 g/mol, more preferably 10.000 to 30.000 g/mol.

Block copolymers according to the invention preferably have a polydispersity (Mw/Mn) from 1.5 to 5, more preferably 2 to 4 (determined by GPC according to the procedure given in the experimental section).

In one embodiment, the alkylene oxide blocks and polyalkylene oxide blocks are chosen such that block copolymers according to the invention have only one glass transition temperature.

In another embodiment, the alkylene oxide blocks and polyalkylene oxide blocks are chosen such that block copolymers according to the invention have two glass transition temperatures.

Another aspect of the present invention are processes for making block copolymers according to the invention.

In one less preferred embodiment of the invention, block copolymers according to the invention are prepared from readily prepared arylene ether blocks and suitable polyalkylene oxide blocks that are treated in a suitable solvent under suitable reaction conditions.

In another less preferred embodiment of the invention, block copolymers according to the invention are prepared from α,ω-Cl-terminated polyalkylene glycols by reacting such α,ω-Cl-terminated polyalkylene glycols with the monomers forming the arylene ether blocks. Such processes are for example disclosed in EP 781795 on p. 5, ln. 42 to p. 7, ln 52.

In a preferred embodiment of the invention, block copolymers according to the invention are prepared by preparing suitable polyarylene ethers in the presence of suitable polyalkylene oxides.

For example, block copolymers according to the invention can be prepared by reacting aromatic bishalogeno compounds and aromatic biphenols or salts thereof in the presence of at least one suitable base and in the presence of at least two polyalkylene oxides that are endcapped with different endcapping groups (two sets of polyalkylene oxies). Suitable polyarylene oxides and endcapped polyalkyleneoxides are described above.

Suitable bases for these processes are for example inorganic carbonates or hydroxides.

For example, block copolymers according to the invention can be prepared from the reaction of aromatic bishalogeno compounds and aromatic biphenols or salts thereof in the presence of suitable polyalkylene oxides and in the presence of at least one alkali metal or ammonium carbonate or hydrogencarbonate in an aprotic solvent, as described U.S. Pat. No. 4,870,153, col. 4, ln. 11 to col. 17, ln. 64, EP 113 112, p. 6, ln. 1 to p. 9, ln. 14, EP-A 297 363, p. 10, ln 38 to p. 11, ln. 24, EP-A 135 130, p. 1, ln 37 to p. 4, ln. 20, which are incorporated in this application by reference.

Processes according to the invention allow the preparation of block copolymers according to the invention in a relatively short reaction time and with high purity.

Another aspect of the invention are block copolymers that are obtained using processes according to the invention.

Block copolymers according to the invention have a high glass transition temperature. In particular, block copolymers according to the invention have a glass transition temperature that is higher than that of block copolymers comprising comparable amounts of polyalkylene oxide blocks that are endcapped with only one of the of alkyl rest present in the polymer according to the invention.

Furthermore, block copolymers according to the invention have very good dimensional stabilities, high heat distortion resistance, good mechanical properties and good flame retardance properties and biocompatibility. They can be processed and handled at high temperatures, enabling the manufacture of products that are exposed to high temperatures and are for example subjected to disinfection using steam, water vapor or higher temperatures, for example above 100° C. or above 125° C.

Furthermore, block copolymers according to the invention can be produced efficiently with short reaction times and using simple equipment.

Block copolymers according to the invention are useful for making products with high requirements to their chemical and mechanical properties. Block copolymers according to the invention are further suitable for applications involving injection molding Block copolymers according to the invention are further useful for making membranes. Another aspect of the present invention are therefore membranes comprising block copolymers according to the invention. Such membranes can be hydrophilic membranes. In the context of this application a membrane shall be understood to be a thin, semipermeable structure capable of separating two fluids or separating molecular and/or ionic components or particles from a liquid.

A membrane acts as a selective barrier, allowing some particles, substances or chemicals to pass through, but not others.

For example, block copolymers according to the invention can be used to make reverse osmosis (RO) membranes, forward osmosis (FO) membranes, nanofiltration (NF) membranes, ultrafiltration (UF) membranes or microfiltration (MF) membranes. These membrane types are generally known in the art.

In one embodiment, block copolymers according to the invention are used to make membranes or the separating layer of membranes, especially in ultrafiltration, nanofiltration or microfiltration membranes.

In one embodiment, block copolymers according to the invention are used to make support layers, carrier materials, stabilizing layers or other parts of membranes, especially in reverse osmosis or forward osmosis.

FO membranes are normally suitable for treatment of seawater, brackish water, sewage or sludge streams. Thereby pure water is removed from those streams through a FO membrane into a so called draw solution on the back side of the membrane having a high osmotic pressure.

In a preferred embodiment, suitable FO membranes are thin film composite (TFC) FO membranes. Preparation methods and use of thin film composite membranes are principally known and, for example described by R. J. Petersen in Journal of Membrane Science 83 (1993) 81-150.

In a particularly preferred embodiment, suitable FO membranes comprise a fabric layer, a support layer, a separation layer and optionally a protective layer. Said protective layer can be considered an additional coating to smoothen and/or hydrophilize the surface.

Said fabric layer can for example have a thickness of 10 to 500 µm. Said fabric layer can for example be a woven or nonwoven, for example a polyester nonwoven.

Said support layer of a TFC FO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, PVDF, polyimide, polyimideurethane or cellulose acetate.

In a preferred embodiment, FO membranes comprise a support layer comprising as the main component at least one block copolymer according to the invention.

In another embodiment, FO membranes comprise a support layer comprising as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone (PSU), polyphenylensulfone (PPSU) or polyethersulfone (PESU) different from block copolymers according to the invention, or mixtures thereof in combination with block copolymers according to the invention.

In another preferred embodiment, FO membranes comprise a support layer comprising as the main components at least one polysulfone, polyphenylensulfone and/or polyethersulfone different from block copolymers according to the invention in combination with block copolymers according to the invention.

Nano particles such as zeolites, may be comprised in said support membrane. This can for example be achieved by including such nano particles in the dope solution for the preparation of said support layer.

Said separation layer of a FO membrane can for example have a thickness of 0.05 to 1 µm, preferably 0.1 to 0.5 µm, more preferably 0.15 to 0.3 µm. Preferably, said separation layer can for example comprise polyamide or cellulose acetate as the main component.

Optionally, TFC FO membranes can comprise a protective layer with a thickness of 30-500 preferable 100-300 nm. Said protective layer can for example comprise polyvinylalcohol (PVA) as the main component. In one embodiment, the protective layer comprises a halamine like chloramine.

In one preferred embodiment, suitable membranes are TFC FO membranes comprising a support layer comprising block copolymers according to the invention, a separation layer comprising polyamide as main component and optionally a protective layer comprising polyvinylalcohol as the main component.

In a preferred embodiment suitable FO membranes comprise a separation layer obtained from the condensation of a polyamine and a polyfunctional acyl halide. Said separation layer can for example be obtained in an interfacial polymerization process.

RO membranes are normally suitable for removing molecules and ions, in particular monovalent ions. Typically, RO membranes are separating mixtures based on a solution/diffusion mechanism.

In a preferred embodiment, suitable membranes are thin film composite (TFC) RO membranes. Preparation methods and use of thin film composite membranes are principally known and, for example described by R. J. Petersen in Journal of Membrane Science 83 (1993) 81-150.

In a further preferred embodiment, suitable RO membranes comprise a fabric layer, a support layer, a separation layer and optionally a protective layer. Said protective layer can be considered an additional coating to smoothen and/or hydrophilize the surface Said fabric layer can for example have a thickness of 10 to 500 µm. Said fabric layer can for example be a woven or nonwoven, for example a polyester nonwoven.

Said support layer of a TFC RO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, PVDF, polyimide, polyimideurethane or cellulose acetate.

In a preferred embodiment, RO membranes comprise a support layer comprising as the main component at least one block copolymer according to the invention.

In another embodiment, RO membranes comprise a support layer comprising as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block copolymers according to the invention.

In another preferred embodiment, RO membranes comprise a support layer comprising as the main component at least one polysulfone, polyphenylensulfone and/or polyethersulfone different from block copolymers according to the invention in combination with block copolymers according to the invention.

Nano particles such as zeolites, may be comprised in said support membrane. This can for example be achieved by including such nano particles in the dope solution for the preparation of said support layer.

Said separation layer can for example have a thickness of 0.02 to 1 μm, preferably 0.03 to 0.5 μm, more preferably 0.05 to 0.3 μm. Preferably, said separation layer can for example comprise polyamide or cellulose acetate as the main component.

Optionally, TFC RO membranes can comprise a protective layer with a thickness of 5 to 500 preferable 10 to 300 nm. Said protective layer can for example comprise polyvinylalcohol (PVA) as the main component. In one embodiment, the protective layer comprises a halamine like chloramine.

In one preferred embodiment, suitable membranes are TFC RO membranes comprising a nonwoven polyester fabric, a support layer comprising block copolymers according to the invention, a separation layer comprising polyamide as main component and optionally a protective layer comprising polyvinylalcohol as the main component.

In a preferred embodiment suitable RO membranes comprise a separation layer obtained from the condensation of a polyamine and a polyfunctional acyl halide. Said separation layer can for example be obtained in an interfacial polymerization process.

Suitable polyamine monomers can have primary or secondary amino groups and can be aromatic (e.g. a diaminobenzene, a triaminobenzene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g. ethylenediamine, propylenediamine, piperazine, and tris(2-diaminoethyl)amine).

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

In one embodiment of the invention, a separation layer of polyamide is made from the reaction of an aqueous solution of meta-phenylene diamine MPD with a solution of trimesoyl chloride (TMC) in an apolar solvent.

NF membranes are normally especially suitable for removing multivalent ions and large monovalent ions. Typically, NF membranes function through a solution/diffusion or/and filtration-based mechanism.

NF membranes are normally used in crossflow filtration processes.

In one embodiment of the invention NF membranes comprise block copolymers according to the invention as the main component.

In another embodiment, NF membranes comprise as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene (PTFE), Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block copolymers according to the invention.

In another embodiment of the invention, NF membranes comprise as the main component at least one polysulfone, polyphenylensulfone and/or polyethersulfone different from block copolymers according to the invention in combination with block copolymers according to the invention.

In a particularly preferred embodiment, the main components of a NF membrane are positively or negatively charged.

Nanofiltration membranes often comprise charged polymers comprising sulfonic acid groups, carboxylic acid groups and/or ammonium groups in combination with block copolymers according to the invention.

In another embodiment, NF membranes comprise as the main component polyamides, polyimides or polyimide urethanes, Polyetheretherketone (PEEK) or sulfonated polyetheretherketone (SPEEK), in combination with block copolymers according to the invention.

UF membranes are normally suitable for removing suspended solid particles and solutes of high molecular weight, for example above 100.000 Da. In particular, UF membranes are normally suitable for removing bacteria and viruses.

UF membranes normally have an average pore diameter of 0.5 nm to 50 nm, preferably 1 to 40 nm, more preferably 5 to 20 nm.

In one embodiment of the invention UF membranes comprise block copolymers according to the invention as the main component.

In another embodiment, UF membranes comprise as the main component at least one polyimide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone, or polyethersulfone different from block copolymers according to the invention, or mixtures thereof in combination with block copolymers according to the invention.

In another embodiment of the invention, UF membranes comprise as the main component at least one polysulfone, polyphenylensulfone and/or polyethersulfone different from block copolymers according to the invention in combination with block copolymers according to the invention.

In one preferred embodiment, block copolymers according to the invention are used to make UF membranes, wherein block copolymers according to the invention are comprised in an amount from 1 to 100% by weight, preferably 5 to 95% by weight, more preferably 10 to 70 and especially preferably 15 to 50% by weight.

In one embodiment, UF membranes comprise further additives like polyvinyl pyrrolidones or polyalkylene oxides like polyethylene oxides.

In a preferred embodiment, UF membranes comprise as major components polysulfones, polyphenylenesulfones or polyethersulfone different from block copolymers according to the invention in combination with at least one block copolymer according to the invention and with further additives like polyvinylpyrrolidone.

In one preferred embodiment, UF membranes comprise 99.9 to 50% by weight of a combination of polyethersulfone different from block copolymers according to the invention and block copolymers according to the invention and 0.1 to 50% by weight of polyvinylpyrrolidone.

In another embodiment UF membranes comprise 95 to 80% by weight of polyethersulfone different from block copolymers according to the invention and block copolymers according to the invention and 5 to 15% by weight of polyvinylpyrrolidone.

In one embodiment of the invention, UF membranes are present as spiral wound membranes, as pillows or flat sheet membranes.

In another embodiment of the invention, UF membranes are present as tubular membranes.

In another embodiment of the invention, UF membranes are present as hollow fiber membranes or capillaries.

In yet another embodiment of the invention, UF membranes are present as single bore hollow fiber membranes.

In yet another embodiment of the invention, UF membranes are present as multi bore hollow fiber membranes.

Multiple channel membranes, also referred to as multibore membranes, comprise more than one longitudinal channels also referred to simply as "channels".

In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels.

In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter.

In some cases, the actual form of such channels may deviate from the idealized circular, ellipsoid or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm.

For channels with an essentially rectangular shape, these channels can be arranged in a row.

For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel.

The wall thickness in such multiple channel membranes is normally from 0.02 to 1 mm at the thinnest position, preferably 30 to 500 µm, more preferably 100 to 300 µm.

Normally, the membranes according to the invention and carrier membranes have an essentially circular, ellipsoid or rectangular diameter. Preferably, membranes according to the invention are essentially circular.

In one preferred embodiment, membranes according to the invention have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm.

In another preferred embodiment, membranes according to the invention have a diameter (for essentially circular diameters), smaller diameter (for essentially ellipsoid diameters) or smaller feed size (for essentially rectangular diameters) of 2 to 4 mm.

In one embodiment the rejection layer is located on the inside of each channel of said multiple channel membrane In one embodiment, the channels of a multibore membrane may incorporate an active layer with a pore size different to that of the carrier membrane or a coated layer forming the active layer. Suitable materials for the coated layer are polyoxazoline, polyethylene glycol, polystyrene, hydrogels, polyamide, zwitterionic block copolymers, such as sulfobetaine or carboxybetaine. The active layer can have a thickness in the range from 10 to 500 nm, preferably from 50 to 300 nm, more preferably from 70 to 200 nm.

Preferably multi bore membranes are designed with pore sizes between 0.2 and 0.01 µm. In such embodiments the inner diameter of the capillaries can lie between 0.1 and 8 mm, preferably between 0.5 and 4 mm and particularly preferably between 0.9 and 1.5 mm. The outer diameter of the multi bore membrane can lie between 1 and 26 mm, preferred 2.3 and 14 mm and particularly preferred between 3.6 and 6 mm. Furthermore, the multi bore membrane can contain 2 to 94, preferably 3 to 19 and particularly preferred between 3 and 14 channels. Often multi bore membranes contain seven channels. The permeability range can for example lie between 100 and 10000 $L/m^2hbar$, preferably between 300 and 2000 $L/m^2hbar$.

Typically multi bore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

MF membranes are normally suitable for removing particles with a particle size of 0.1 µm and above.

MF membranes normally have an average pore diameter of 0.05 µm to 10 µm, preferably 1.0 µm to 5 µm.

Microfiltration can use a pressurized system but it does not need to include pressure.

MF membranes can be hollow fibers, capillaries, flat sheet, tubular, spiral wound, pillows, hollow fine fiber or track etched. They are porous and allow water, monovalent species (Na+, Cl—), dissolved organic matter, small colloids and viruses through but retain particles, sediment, algae or large bacteria.

Microfiltration systems are designed to remove suspended solids down to 0.1 micrometers in size, in a feed solution with up to 2-3% in concentration.

In one embodiment of the invention MF membranes comprise block copolymers according to the invention as the main component.

In another embodiment, MF membranes comprise as the main component at least polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone different from block copolymers according to the invention, or mixtures thereof in combination with block copolymers according to the invention.

In another embodiment of the invention, MF membranes comprise as the main component at least one polysulfone, polyphenylenesulfone and/or polyethersulfone different from block copolymers according to the invention in combination with block copolymers according to the invention.

In one preferred embodiment, block copolymers according to the invention are used to make MF membranes, wherein block copolymers according to the invention are comprised in an amount from 1 to 100% by weight, preferably 5 to 95% by weight, more preferably 10 to 70 and especially preferably 15 to 50% by weight.

Membranes according to the invention have a high glass transition temperature. In particular, membranes according to the invention have a glass transition temperature that is higher than that of membranes that do not comprise block copolymers according to the invention.

Membranes according to the invention are easy to make and to handle, are able to stand high temperatures and can for example be subjected to vapor sterilization.

Furthermore, membranes according to the invention have very good dimensional stabilities, high heat distortion resistance, good mechanical properties and good flame retardance properties and biocompatibility. They can be processed and handled at high temperatures, enabling the manufacture of membranes and membrane modules that are exposed to high temperatures and are for example subjected to disinfection using steam, water vapor or higher temperatures, for example above 100° C. of above 125° C.

Membranes according to invention show excellent properties with respect to the decrease of flux through a membrane over time and their fouling and biofouling properties.

Membranes according to the invention are easy and economical to make.

Filtration systems and membranes according to invention can be made using aqueous or alcoholic systems and are thus environmentally friendly. Furthermore, leaching of toxic substances is not problematic with membranes according to the invention.

Membranes according to the invention have a long lifetime.

Another aspect of the invention are membrane elements comprising a copolymer according to the invention.

A "membrane element", herein also referred to as a "filtration element", shall be understood to mean a membrane arrangement of at least one single membrane body. A filtration element can either be directly used as a filtration module or be included in a membrane module. A membrane module, herein also referred to as a filtration module, comprises at least one filtration element. A filtration module normally is a ready to use part that in addition to a filtration element comprises further components required to use the filtration module in the desired application, such as a module housing and the connectors. A filtration module shall thus be understood to mean a single unit which can be installed in a membrane system or in a membrane treatment plant. A membrane system herein also referred to as a filtration system is an arrangement of more than one filtration module that are connected to each other. A filtration system is implemented in a membrane treatment plant.

In many cases, filtration elements comprise more than one membrane arrangement and may further comprise more components like an element housing, one or more bypass tubes, one or more baffle plates, one or more perforated inner tubes or one or more filtrate collection tube. For hollow fiber or multibore membranes, for example, a filtration element normally comprises more than one hollow fiber or multibore membrane arrangement that have been fixed to an outer shell or housing by a potting process. Filtration elements that have been subjected to potting can be fixed on one end or on both ends of the membrane arrangement to the outer shell or housing.

In one embodiment, filtration elements or filtration modules according to the invention discharge permeate directly through an opening in the tube housing or indirectly through a discharge tube located within the membrane element. Particularly when indirect discharge is facilitated the discharge tube can for example be placed in the center of the membrane element and the capillaries of the membrane element are arranged in bundles surrounding the discharge tube.

In another embodiment, a filtration element for filtering comprises an element housing, wherein at least one membrane arrangement and at least one permeate collecting tube are arranged within the element housing and wherein the at least one permeate collecting tube is arranged in an outer part of the filtration element.

The permeate collecting tube inside filtration elements or filtration modules may in one embodiment have cylindrical shape, wherein the cross-section may have any shape such as round, oval, triangular, square or some polygon shape. Preferred is a round shape, which leads to enhanced pressure resistance. Preferably the longitudinal center line of the at least one permeate collecting tube is arranged parallel to the longitudinal center line of the membrane element and the element housing. Furthermore, a cross-section of the permeate collecting tube may be chosen according to the permeate volume produced by the membrane element and pressure losses occurring in the permeate collecting tube. The diameter of the permeate collecting tube may be less than half, preferred less than a third and particularly preferred less than a quarter of the diameter of the element housing.

The permeate collecting tube and the membrane element may have different or the same shape. Preferably the permeate collecting tube and the membrane element have the same shape, particularly a round shape. Thus, the at least one permeate collecting tube can be arranged within the circumferential ring extending from the radius of the element housing to half, preferred a third and particularly preferred a quarter of the radius of the element housing.

In one embodiment the permeate collecting tube is located within the filtration element such that the permeate collecting tube at least partially touches the element housing. This allows placing the filtration element in the filtration module or system such that the permeate collecting tube is arranged substantially at the top of the filtration element in horizontal arrangement. In this context substantially at the top includes any position in the outer part of the membrane that lies within ±45°, preferred ±10° from a vertical center axis in a transverse plane of the filtration element. Here the vertical center axis in a transverse plane is perpendicular to the horizontal center axis in the transverse plane and to the longitudinal center axis extending along the long axis of the filtration element. By arranging the permeate collecting tube this way, air residing within the membrane element before start-up of the filtration module or system can be collected in the permeate collecting tube, which can then easily be vented upon start up by starting the filtration operation. In particular, air pockets can be displaced by permeate which is fed to the filtration module or system and filtered by the membrane element on start up. By releasing air from the filtration module or system the active area of the membrane element increases, thus increasing the filtering effect. Furthermore the risk of fouling due to trapped air pockets decreases and pressure surges as well as the risk of breakage of the membrane element are minimized.

In another embodiment of the filtration element at least two permeate collecting tubes may be arranged in the filtration element, particularly within the element housing. By providing more than one permeate collecting tube the output volume of permeate at a constant pressure can be increased and adjusted to the permeate volume produced by the membrane element. Furthermore the pressure loss is reduced if high backwashing flows are required. Here at least one first permeate collecting tube is arranged in the outer part of the filtration element and at least one second permeate collecting tube can be arranged in the inner or the outer part of the filtration element. For example, two permeate collecting tubes may be arranged in the outer part or one first permeate collecting tube may be arranged in the outer part and another second permeate collecting tube may be arranged in the inner part of the filtration element.

Preferably at least two permeate collecting tubes are arranged opposite each other in the outer part or the outer circumferential ring of the filtration element. By providing at least two permeate collecting tubes opposite each other in the outer part of the filtration element, the filtration element can be placed in a filtration module or system such that one of the tubes are arranged substantially at the top of the element while the other tube is arranged substantially at the bottom. This way ventilation can be achieved through the top tube, while the additional bottom tube increases output volume at a constant pressure.

In another embodiment the filtration element further comprises a perforated tube arranged around the membrane element, in particular composing at least one membrane arrangement comprising at least one hollow fiber membrane. The perforations may be formed by holes or other openings located in regular or irregular distances along the tube. Preferably, the membrane element, in particular the membrane arrangement is enclosed by the perforated tube. With the perforated tube the axial pressure distribution along the filtration element can be equalized in filtration and back washing operation. Thus, the permeate flow is evenly distributed along the filtration element and hence the filtering effect can be increased.

In another embodiment the perforated tube is arranged such that an annular gap is formed between the element housing and the perforated tube. Known membrane elements do not have a distinct border and the membrane element are directly embedded in a housing of the filtration element. This leads to an uneven pressure distribution in axial direction as the axial flow is disturbed by the membrane element.

In another embodiment the membrane element comprises multibore membranes. The multi bore membranes preferably comprise more than one capillary, which runs in a channel along the longitudinal axis of the membrane element or the filtration element. Particularly, the multi bore membrane comprises at least one substrate forming the channels and at least one active layer arranged in the channels forming the capillaries. Embedding the capillaries within a substrate allows forming a multi bore membrane, which are considerably easier to mount and mechanically more stable than membranes based on single hollow fibers. As a result of the mechanical stability, the multi bore membrane is particularly suitable for cleansing by back washing, where the filtration direction is reversed such that a possible fouling layer formed in the channels is lifted and can be removed. In combination with the arrangements of the permeate collecting tube leading to an even pressure distribution within the membrane element, the overall performance and stability of the filtration element is further enhanced.

In contrast to designs with a central discharge tube and single bore membranes, the distribution of the multi bore membranes is advantageous in terms of producing lower pressure loss in both operational modes filtration and backwash. Such designs further increases stability of the capillaries by equalizing the flow or pressure distribution across the membrane element. Thus, such designs avoid adverse effects on the pressure distribution among the capillaries of the membrane element. For designs with a central permeate collecting tube permeate flows in filtration mode from the outer capillaries of the membrane to the inner capillaries and has to pass a decreasing cross-section. In backwashing mode the effect reverses in that sense, that the flow volume decreases towards the outer capillaries and thus the cleaning effect decreases towards the outside as well. In fact the uneven flow and pressure distribution within the membrane element leads to the outer capillaries having a higher flow in filtration mode and hence building up more fouling layer than the inner capillaries. In backwashing mode, however, this reverses to the contrary with a higher cleaning effect for the inner capillaries, while the outer exhibit a higher build up. Thus the combination of the permeate collecting tube in the outer part of the filtration element and the use of the multi-bore membrane synergistically lead to a higher long-term stability of the filtration element.

Another aspect of the invention are membrane modules comprising membranes or membrane elements according to the invention.

In one embodiment, membrane modules according to the invention comprise a filtration element which is arranged within a module housing. The raw water is at least partly filtered through the filtration element and permeate is collected inside the filtration module and removed from the filtration module through an outlet. In one embodiment the filtrate (also referred to as "permeate") is collected inside the filtration module in a permeate collection tube. Normally the element housing, optionally the permeate collecting tube and the membrane arrangement are fixed at each end in membrane holders comprising a resin, preferably an epoxy resin, in which the filtration element housing, the membranes, preferably multibore membranes, and optionally the filtrate collecting tube are embedded.

Membrane modules can in one embodiment for example have cylindrical shape, wherein the cross-section can have any shape such as round, oval, triangular, square or some polygon shape. Preferred is a round shape, which leads to a more even flow and pressure distribution within the membrane element and avoids collection of filtered material in certain areas such as corners for e.g. square or triangular shapes.

In one embodiment, membrane modules according to the invention have an inside-out configuration ("inside feed") with the filtrate flowing from the inside of a hollow fiber or multibore membrane to the outside.

In one embodiment, membrane modules according to the invention have an outside-in filtration configuration ("outside feed").

In a preferred embodiment, membranes, filtration elements, filtration modules and filtration systems according to the invention are configured such that they can be subjected to backwashing operations, in which filtrates is flushed through membranes in opposite direction to the filtration mode.

In one embodiment, membrane modules according to the invention are encased.

In another embodiment, membrane modules according to the invention are submerged in the fluid that is to be subjected to filtration.

In one embodiment, membranes, filtration elements, filtration modules and filtration systems according to the invention are used in membrane bioreactors.

In one embodiment, membrane modules according to the invention have a dead-end configuration and/or can be operated in a dead-end mode.

In one embodiment, membrane modules according to the invention have a crossflow configuration and/or can be operated in a crossflow mode.

In one embodiment, membrane modules according to the invention have a directflow configuration and/or can be operated in a directflow mode.

In one embodiment, membrane modules according to the invention have a configuration that allow the module to be cleaned and scoured with air.

In one embodiment, filtration modules include a module housing, wherein at least one filtration element as described above is arranged within the module housing. Hereby the filtration element is arranged vertically or horizontally. The module housing is for instance made of fiber reinforced plastic (FRP) or stainless steel.

In one embodiment the at least one filtration element is arranged within the module housing such that the longitudinal center axis of the filtration element and the longitudinal center axis of the housing are superimposed. Preferably the filtration element is enclosed by the module housing, such that an annular gap is formed between the module housing and the element housing. The annular gap between the element housing and the module housing in operation allow for an even pressure distribution in axial direction along the filtration module.

In another embodiment the filtration element is arranged such that the at least one permeate collecting tube is located substantially at the top of the filtration module or filtration element. In this context substantially at the top includes any position in the outer part of the membrane element that lies within ±45°, preferred ±10°, particularly preferred ±5° from a vertical center axis in a transverse plane of the filtration element. Furthermore, the vertical center axis in a transverse plane is perpendicular to the horizontal center axis in the transverse plane and to the longitudinal center axis extending along the long axis of the filtration element. By arranging the permeate collecting tube this way, air residing within the filtration module or system before start up can be collected in the permeate collecting tube, which can then easily be vented upon start up by starting the filtration operation. In particular, air pockets can be displaced by permeate, which is fed to the filtration module or system on start up. By releasing air from the filtration module or system the active area of the membrane element is increased, thus increasing the filtering effect. Furthermore, the risk of fouling due to trapped air pockets decreases. Further preferred the filtration module is mount horizontally in order to orientate the permeate collecting tube accordingly.

In another embodiment the filtration element is arranged such that at least two permeate collecting tubes are arranged opposite each other in the outer part of the filtration element. In this embodiment the filtration module can be oriented such that one of the permeate collecting tubes are arranged substantially at the top of the filtration element, while the other tube is arranged substantially at the bottom of the filtration element. This way the ventilation can be achieved through the top tube, while the bottom tube allows for a higher output volume at a constant pressure. Furthermore, the permeate collecting tubes can have smaller dimensions compared to other configurations providing more space to be filled with the membrane element and thus increasing the filtration capacity.

In one embodiment, membrane modules according to the invention can have a configuration as disclosed in WO 2010/121628, S. 3, Z. 25 to p. 9, ln 5 and especially as shown in FIG. 2 and FIG. 3 of WO 2010/121628.

In one embodiment membrane modules according to the invention can have a configuration as disclosed in EP 937 492, [0003] to [0020].

In one embodiment membrane modules according to the invention are capillary filtration membrane modules comprising a filter housing provided with an inlet, an outlet and a membrane compartment accommodating a bundle of membranes according to the invention, said membranes being cased at both ends of the membrane module in membrane holders and said membrane compartment being provided with discharge conduits coupled to the outlet for the conveyance of the permeate. In one embodiment said discharge conduits comprise at least one discharge lamella provided in the membrane compartment extending substantially in the longitudinal direction of the filtration membranes.

Another aspect of the invention are filtration systems comprising membrane modules according to the invention. Connecting multiple filtration modules normally increases the capacity of the filtration system. Preferably the filtration modules and the encompassed filtration elements are mounted horizontally and adapters are used to connect the filtration modules accordingly.

In one embodiment, filtration systems according to the invention comprise arrays of modules in parallel.

In one embodiment, filtration systems according to the invention comprise arrays of modules in horizontal position.

In one embodiment, filtration systems according to the invention comprise arrays of modules in vertical position.

In one embodiment, filtration systems according to the invention comprise a filtrate collecting vessel (like a tank, container).

In one embodiment, filtration systems according to the invention use filtrate collected in a filtrate collecting tank for backwashing the filtration modules.

In one embodiment, filtration systems according to the invention use the filtrate from one or more filtration modules to backwash another filtration module.

In one embodiment, filtration systems according to the invention comprise a filtrate collecting tube.

In one embodiment, filtration systems according to the invention comprise a filtrate collecting tube to which pressurized air can be applied to apply a backwash with high intensity.

In one embodiment, filtration systems according to the invention have a configuration as disclosed in EP 1 743 690, col. 2, ln. 37 to col. 8, ln. 14 and in FIG. 1 to FIG. 11 of EP 1 743 690; EP 2 008 704, col. 2, ln. 30 to col. 5, ln. 36 and FIG. 1 to FIG. 4; EP 2 158 958, col. 3, ln. 1 to col. 6, ln. 36 and FIG. 1.

In one embodiment filtration systems according to the invention comprise more than one filtration modules arranged vertically in a row, on both of whose sides an inflow pipe is arrayed for the fluid to be filtered and which open out individually allocated collecting pipes running lengthwise per row, whereby each filtration module has for the filtrate at least one outlet port which empties into a filtrate collecting pipe, whereby running along the sides of each row of filtration modules is a collecting pipe that has branch pipes allocated to said pipe on each side of the filtration module via which the allocated filtration module is directly connectable, wherein the filtrate collecting pipe runs above and parallel to the upper two adjacent collecting pipes.

In one embodiment, filtration systems according to the invention comprise a filtrate collecting pipe that is connected to each of the filtration modules of the respective filtration system and that is designed as a reservoir for backwashing the filtration system, wherein the filtration system is configured such that in backwashing mode pressurized air is applied to the filtrate collecting pipe to push permeate water from the permeate collecting pipe through the membrane modules in reverse direction.

In one embodiment, filtration systems according to the invention comprise a plurality of module rows arranged in parallel within a module rack and supplyable with raw water through supply/drain ports and each end face via respectively associated supply/drain lines and each including a drain port on a wall side for the filtrate, to which a filtrate collecting line is connected for draining the filtrate, wherein valve means are provided to control at least one filtration and backwashing mode, wherein, in the backwashing mode, a supply-side control valve of the first supply/drain lines carrying raw water of one module row is closed, but an associated drain-side control valve of the other supply/drain line of one module row serving to drain backwashing water is open, whereas the remaining module rows are open, to ensure backwashing of the one module row of the module rack by the filtrate simultaneously produced by the other module rows.

Hereinafter, when reference is made to the use of "membranes" for certain applications, this shall include the use of the membranes as well as filtration elements, membrane modules and filtration systems comprising such membranes and/or membrane modules.

In a preferred embodiment, membranes according to the invention are used for the treatment of sea water or brackish water.

In one preferred embodiment of the invention, membranes according to the invention, particularly RO, FO or NF membranes are used for the desalination of sea water or brackish water.

Membranes according to the invention, particularly RO, FO or NF membranes are used for the desalination of water with a particularly high salt content of for example 3 to 8% by weight. For example membranes according to the invention are suitable for the desalination of water from mining and oil/gas production and fracking processes, to obtain a higher yield in these applications.

Different types of membrane according to the invention can also be used together in hybrid systems combining for example RO and FO membranes, RO and UF membranes, RO and NF membranes, RO and NF and UF membranes, NF and UF membranes.

In another preferred embodiment, membranes according to the invention, particularly NF, UF or MF membranes are used in a water treatment step prior to the desalination of sea water or brackish water.

In another preferred embodiment membranes according to the invention, particularly NF, UF or MF membranes are used for the treatment of industrial or municipal waste water.

Membranes according to the invention, particularly RO and/or FO membranes can be used in food processing, for example for concentrating, desalting or dewatering food liquids (such as fruit juices), for the production of whey protein powders and for the concentration of milk, the UF permeate from making of whey powder, which contains lactose, can be concentrated by RO, wine processing, providing water for car washing, making maple syrup, during electrochemical production of hydrogen to prevent formation of minerals on electrode surface, for supplying water to reef aquaria.

Membranes according to the invention, particularly UF membranes can be used in medical applications like in dialysis and other blood treatments, food processing, concentration for making cheese, processing of proteins, desalting and solvent-exchange of proteins, fractionation of proteins, clarification of fruit juice, recovery of vaccines and antibiotics from fermentation broth, laboratory grade water purification, drinking water disinfection (including removal of viruses), removal of endocrines and pesticides combined with suspended activated carbon pretreatment.

Membranes according to the invention, particularly RO, FO, NF membranes can be used for rehabilitation of mines, homogeneous catalyst recovery, desalting reaction processes.

Membranes according to the invention, particularly NF membranes, can be used for separating divalent ions or heavy and/or radioactive metal ions, for example in mining applications, homogeneous catalyst recovery, desalting reaction processes.

EXAMPLES

Abbreviations

DCDPS 4,4'-Dichlorodiphenylsulfone
DHDPS 4,4'-Dihydroxydiphenylsulfone
NMP N-methylpyrrolidone
DMAc Dimethylacetamide
PWP pure water permeation
MWCO molecular weight cutoff The viscosity of copolymers was measured as a 1% by weight solution of the copolymer in NMP at 25° C. according to DIN EN ISO 1628-1.

Copolymers were isolated from their solution by precipitation of solutions of the copolymers in water at room temperature (height of spray reactor 0.5 m, flux: 2.5 l/h). The so obtained beads were then extracted with water at 85° C. for 20 hours (water flow 160 l/h). The beads were then dried to a water content of less than 0.1% by weight.

The molecular weight distribution and the average molecular weight of the copolymers were determined by GPC measurements in DMAc.

GPC-measurements were done using Dimethylacetamide/ 0.5 wt.-% LiBr as eluent. The concentration of the polymer solution was 4 mg/ml. After filtration (pore size 0.2 μm), 100 μl of this solution was injected in the GPC system. For the separation 4 different columns (heated to 80° C.) were used (GRAM pre-column, GRAM 30 A, GRAM 1000 A, GRAM 1000 A, separation material: polyester copolymers). The system was operated with a flow rate of 1 ml/min. As detection system a DRI Agilent 1100 was used.

The calibration was done with PMMA-standards with molecular weights (Mn) from 800 to 1820000 g/mol.

Molecular weights of the polymers obtained were determined by comparison of the viscosity obtained according to DIN EN ISO 1628-1 as a 1% by weight solution in NMP.

The content of polyalkyleneoxide in the block copolymer was determined using $^1$H-NMR in $CDCl_3$. The signal intensity of resonance signals for H-atoms of polyalkylene groups was compared to the signal intensity of resonance signals for H-atoms of aromatic groups comprised in polyarylene ether blocks. This comparison yields the ratio of polyalkylene oxide to polyarylene ether that can be can be used to calculate the content of polyalkylene oxide in the copolymer by weight.

The glass transition temperature of the products was determined by DSC analysis. All DSC-measurements were done using a DSC 2000 of TA Instruments at a heating rate of 20 k/min. About 5 mg material were placed in an Aluminum vessel and sealed. In the first run, the samples were heated to 250° C., rapidly cooled to −100° C. and then in the second run heated to 250° C. The Tg-values given were determined in the second run.

The results of all measurements are given in table 1.

Preparation of Copolymers

Comparative Example 1: PESU-PEO-Copolymer

In a 4 liter glass reactor fitted with a thermometer, a gas inlet tube and a Dean-Stark-trap, 574.16 g of DCDPS, 490.33 g of DHDPS, 80 g of α-methyl,ω-hydroxy-polyethyleneglykol with a number average molecular mass Mn of 2000 g/mol and 290.24 g of potassium carbonate with a volume average particle size of 32.4 μm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Comparative Example 2: PESU-PEO-Copolymer

In a 4 liter glass reactor fitted with a thermometer, a gas inlet tube and a Dean-Stark-trap, 574.16 g of DCDPS, 487.83 g of DHDPS, 100 g of α-methyl,ω-hydroxy-polyethyleneglykol with a number average molecular mass Mn of 2000 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Comparative Example 3: PESU-PEO-Copolymer

In a 4 liter glass reactor fitted with a thermometer, a gas inlet tube and a Dean-Stark-trap, 574.16 g of DCDPS, 487.83 g of DHDPS, 210 g of α-methyl,ω-hydroxy-polyethyleneglykol with a number average molecular mass Mn of 4200 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Comparative Example 4: PESU-PEO-Copolymer

In a 4 liter glass reactor fitted with a thermometer, a gas inlet tube and a Dean-Stark-trap, 574.16 g of DCDPS, 487.83 g of DHDPS, 220 g of α-stearyl,ω-hydroxy-polyethyleneglykol with a number average molecular mass Mn of 4400 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Example 5 (According to the Invention): PESU-PEO-Copolymer

In a 4 liter glass reactor fitted with a thermometer, a gas inlet tube and a Dean-Stark-trap, 574.16 g of DCDPS, 492.83 g of DHDPS, 93 g of α-$C_{16}$/$C_{18}$-alkyl,ω-hydroxy-polyethyleneglykol with a molar ratio of $C_{16}$/$C_{18}$ rests of 55:45 and with a number average molecular mass Mn of 3100 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Example 6 (According to the Invention): PESU-PEO-Copolymer

In a 4 liter glass reactor fitted with a thermometer, a gas inlet tube and a Dean-Stark-trap, 574.16 g of DCDPS, 485.33 g of DHDPS, 186 g of α-$C_{16}$/$C_{18}$-alkyl,ω-hydroxy-polyethyleneglykol with a molar ratio of 016/018 rests of 55:45 and with a number average molecular mass Mn of 3100 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

Comparative Example 7: PESU-PEO-Copolymer

In a 4 liter glass reactor fitted with a thermometer, a gas inlet tube and a Dean-Stark-trap, 574.16 g of DCDPS, 475.32 g of DHDPS, 205 g of polyethylene glykol with a number average molecular mass Mn of 2050 g/mol and 290.24 g of potassium carbonate with a volume average particle size of 32.4 µm were suspended in 1053 ml NMP in a nitrogen atmosphere.

The mixture was heated to 190° C. within one hour. In the following, the reaction time shall be understood to be the time during which the reaction mixture was maintained at 190° C.

The water that was formed in the reaction was continuously removed by distillation. The solvent level inside the reactor was maintained at a constant level by addition of further NMP.

After a reaction time of six hours, the reaction was stopped by addition of 1947 ml of NMP with a temperature of 23° C. Nitrogen was bubbled through the mixture for one hour with a rate of 20 l/h and the mixture was let to cool to room temperature. The potassium chloride formed in the reaction was removed by filtration.

TABLE 1

Analytical data of copolymers prepared in experiments 1 to 7

|  | 1 | 2 | 3 | 4 | 5 | 6 | 7 |
|---|---|---|---|---|---|---|---|
| viscosity number [ml/g] | 62.1 | 57.4 | 56.4 | 57.9 | 78 | 64.7 | 75.4 |
| polyalkylene oxide content (% by weight) | 8.0 | 9.7 | 18.9 | 19.1 | 8.5 | 15.7 | 18.2 |
| Mw/Mn | 2.9 | 3.2 | 3.4 | 3.4 | 3.2 | 3.2 | 2.9 |
| Tg [° C.] | 174 | 165 | 120 | 119 | 194 | 156 | 122 |

Copolymers according to the invention showed higher glass transition temperatures than those known from the art.

Preparation of Membranes

Example M1: Preparation of PESU Flat Sheet Membranes (Reference Membrane M1

Into a three neck flask equipped with a magnetic stirrer 80 ml of N-methylpyrrolidone (NMP), 5 g of polyvinylpyrrolidone (PVP, Luvitec® K40) and 15 g of polyethersulfone (PESU, Ultrason® E 6020P) were added. The mixture was heated under gentle stirring at 60° C. until a homogeneous clear viscous solution was obtained. The solution was degassed overnight at room temperature.

After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane has detached from the glass plate, the membrane was carefully transferred into a water bath for 12 h. Afterwards the membrane was transferred into a bath containing 2000 ppm NaOCl at 50° C. for 4.5 h to remove PVP. After that process the membrane was washed with water at 60° C. and then one time with a 0.5 wt.-% solution of NaBisulfite to remove active chlorine. After several washing steps with water the membrane was stored wet until characterization started.

A flat sheet continuous film with micro structural characteristics of UF membranes having dimension of at least 10×15 cm size was obtained. The membrane comprised a top thin skin layer (1-3 microns) and a porous layer underneath (thickness: 100-150 microns).

Example M2: Flat Sheet Membranes Based on Copolymers

Into a three neck flask equipped with a magnetic stirrer 80 ml of N-methylpyrrolidone (NMP), 5 g of polyvinylpyrrolidone (PVP, Luvitec® K40) and 15 g of the block copolymer obtained in example 5 were added. The mixture was heated under gentle stirring at 60° C. until a homogeneous clear viscous solution was obtained. The solution was degassed overnight at room temperature.

After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane has detached from the glass plate, the membrane was carefully transferred into a water bath for 12 h. Afterwards the membrane was transferred into a bath containing 2000 ppm NaOCl at 50° C. for 4.5 h to remove PVP. After that process the membrane was washed with water at 60° C. and then one time with a 0.5 wt.-% solution of NaBisulfite to remove active chlorine. After several washing steps with water the membrane was stored wet until characterization started.

A flat sheet continuous film with micro structural characteristics of UF membranes having dimension of at least 10×15 cm size was obtained. The membrane comprised a top thin skin layer (1-3 microns) and a porous layer underneath (thickness: 100-150 microns).

Example M3: Flat Sheet Membranes Based on Copolymers

Into a three neck flask equipped with a magnetic stirrer 80 ml of N-methylpyrrolidone (NMP), 5 g of polyvinylpyrrolidone (PVP, Luvitec® K40) and 15 g of the block copolymer obtained in example 6 were added. The mixture was heated under gentle stirring at 60° C. until a homogeneous clear viscous solution was obtained. The solution was degassed overnight at room temperature.

After that the membrane solution was reheated at 60° C. for 2 hours and casted onto a glass plate with a casting knife (300 microns) at 60° C. using an Erichsen Coating machine operating at a speed of 5 mm/min. The membrane film was allowed to rest for 30 seconds before immersion in a water bath at 25° C. for 10 minutes.

After the membrane has detached from the glass plate, the membrane was carefully transferred into a water bath for 12 h. Afterwards the membrane was transferred into a bath containing 2000 ppm NaOCl at 50° C. for 4.5 h to remove PVP. After that process the membrane was washed with water at 60° C. and then one time with a 0.5 wt.-% solution of NaBisulfite to remove active chlorine. After several washing steps with water the membrane was stored wet until characterization started.

A flat sheet continuous film with micro structural characteristics of UF membranes having dimension of at least 10×15 cm size was obtained. The membrane comprised a top thin skin layer (1-3 microns) and a porous layer underneath (thickness: 100-150 microns).

Membrane Characterization:

Using a pressure cell with a diameter of 60 mm, the pure water permeation of the membranes was tested using ultra-pure water (salt-free water, additionally filtered by a Millipore UF-system). In a subsequent test, a solution of different PEG-Standards was filtered at a pressure of 0.15 bar. By GPC-measurement of the feed and the permeate, the molecular weight cut-off was determined. The data obtained is summarized in table 2.

TABLE 2

| Characterization of membranes obtained in examples M1 to M3 | | | |
|---|---|---|---|
| Sample | M1 (reference) | M2 | M3 |
| PWP [l/m2*h*bar] | 460 | 720 | 850 |
| MWCO [kg/mol] | 90 | 89 | 92 |

The membranes comprising block copolymers according to the invention show higher water permeability at a comparable or slightly improved separation performance than the reference membrane.

The invention claimed is:

1. A block copolymer composition, comprising:
at least two different sets of individual polymers of structure AB and/or ABA, wherein B is a polyethersulfone block of formula IIk:

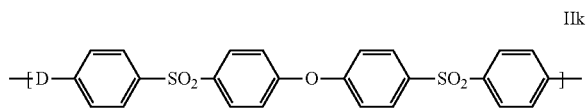

wherein D is a direct bond; and
A represents at least two different polyalkylene oxide blocks designated A' and A" directly covalently bonded to a common polyarylene ether block structure with an ether bond;
wherein
a set of polymers have the same polyalkylene ether blocks A' or A", and
the at least two different polyalkylene oxide blocks are each of formula $R^x$—$(OCH_2$—$CHR^B)_k$—O— (1), wherein
$R^x$ is an aliphatic or aromatic group having from 1 to 20 carbons,
x is an index number which identifies different R groups, with the proviso that at least two different R groups having different x numbers are present,
$R^B$ is hydrogen, an aliphatic group or an aromatic group,
k is a number from 1 to 500.

2. The block copolymer composition according to claim 1, wherein each $R^x$ group is an alkyl group.

3. The block copolymer composition according to claim 1, wherein the different sets of block copolymer comprise identical polyalkylene oxide blocks of formula —$(OCH_2$—$CHR^B)_k$—O— and different $R^x$ groups.

4. The block copolymer composition according to claim 1, wherein $R^B$ is H.

5. The block copolymer composition according to claim 1, wherein x is 1 and 2 and $R^1$ is a $C_{16}$ alkyl and $R^2$ is a $C_{18}$ alkyl.

6. The block copolymer composition according to claim 1, wherein a molar content of each different polyalkylene block of formula I is at least 5 mol % relative to a total molar amount of all polyalkylene oxide blocks of formula I present in the block copolymer composition.

7. The block copolymer composition according to claim 1, comprising at least two different sets of individual polymer molecules of formula III

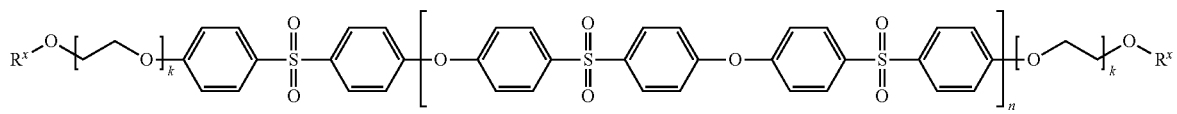

wherein
$R^x$ is an aliphatic or aromatic group,
x is an index number which identifies different R groups, with the proviso that at least two different x numbers are present,
k is a number from 1 to 500,
n is a number from 4 to 150.

8. A process for making the block copolymer composition according to claim 1, comprising reacting aromatic bishalogeno sulfonyl compounds with aromatic biphenols or salts thereof in the presence of at least one base and in the presence of at least two different polyalkyleneoxide compounds comprising different groups of formula (I).

9. A membrane comprising the block copolymer composition according to claim 1.

10. The membrane according to claim 9, wherein the membrane is suitable for ultrafiltration, microfiltration, reverse osmosis, forward osmosis, or nanofiltration.

11. The membrane according to claim 9, wherein the membrane is suitable for water treatment applications, treatment of industrial or municipal waste water, desalination of sea or brackish water, dialysis, plasmolysis, or food processing.

12. The membrane according to claim 9, wherein an amount of the block copolymer composition is from 0.01% by weight to 100% by weight of the membrane.

13. The membrane according to claim 12, wherein the membrane is an ultrafiltration (UF) membrane, a microfiltration (MF) membrane, a reverse osmosis (RO) membrane, a forward osmosis (FO) membrane or a nanofiltration (NF) membrane.

14. A membrane element comprising multiple membranes according to claim 9.

15. A membrane module comprising multiple membranes according to claim 9.

16. A filtration system comprising multiple membrane modules according to claim 15.

\* \* \* \* \*